United States Patent
Klanner et al.

(10) Patent No.: US 12,291,235 B2
(45) Date of Patent: May 6, 2025

(54) DRIVING ASSISTANCE SYSTEM AND DRIVING ASSISTANCE METHOD FOR THE AUTOMATED DRIVING OF A VEHICLE

(71) Applicant: Bayerische Motoren Werke Aktiengesellschaft, Munich (DE)

(72) Inventors: Felix Klanner, Munich (DE); Horst Kloeden, Freiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 233 days.

(21) Appl. No.: 18/008,485

(22) PCT Filed: May 5, 2021

(86) PCT No.: PCT/EP2021/061777
§ 371 (c)(1),
(2) Date: Dec. 6, 2022

(87) PCT Pub. No.: WO2021/254686
PCT Pub. Date: Dec. 23, 2021

(65) Prior Publication Data
US 2023/0211803 A1     Jul. 6, 2023

(30) Foreign Application Priority Data

Jun. 18, 2020 (DE) .................... 10 2020 116 155.7

(51) Int. Cl.
*B60W 60/00* (2020.01)
*B60W 30/18* (2012.01)

(52) U.S. Cl.
CPC .. *B60W 60/0011* (2020.02); *B60W 30/18036* (2013.01); *B60W 2554/4041* (2020.02); *B60W 2554/80* (2020.02); *B60W 2555/60* (2020.02)

(58) Field of Classification Search
CPC ....... B60W 60/0011; B60W 30/18036; B60W 2554/4041; B60W 2554/80;
(Continued)

(56) References Cited

U.S. PATENT DOCUMENTS

2012/0212617 A1* 8/2012 Wang .................. G08G 1/0175
348/149
2015/0286219 A1* 10/2015 Reichel ................. G08G 1/163
701/23
(Continued)

FOREIGN PATENT DOCUMENTS

DE    10 2012 021 282 A1    4/2014
DE    10 2014 211 507 A1    12/2015
(Continued)

OTHER PUBLICATIONS

International Search Report (PCT/ISA/210) issued in PCT Application No. PCT/EP2021/061777 dated Jul. 8, 2021 with English translation (five (5) pages).
(Continued)

*Primary Examiner* — Michael D Lang
(74) *Attorney, Agent, or Firm* — Crowell & Moring LLP (57) ABSTRACT

A driving assistance system for automated driving of a vehicle includes at least one processor unit, which is designed to perform the following when the driving assistance system is carrying out a maneuver of turning onto a street: to determine, on the basis of environment data of an environment sensor system of the vehicle, whether another, on-coming road user is blocking a lane of the street which corresponds to the vehicle; and when it is determined that the other road user is blocking the lane of the street which corresponds to the vehicle to carry out a situation evaluation in order to determine whether the vehicle should back up in order to allow the other road user to exit the street or whether (Continued)

the other road user should be requested to clear the lane by backing up.

9 Claims, 4 Drawing Sheets

(58) Field of Classification Search
CPC ..... B60W 2555/60; B60W 2050/0013; B60W 2554/4044; B60W 2556/65; B60W 30/18145; B60W 60/0027
See application file for complete search history.

(56) References Cited

U.S. PATENT DOCUMENTS

| | | | |
|---|---|---|---|
| 2016/0280266 A1 | 9/2016 | Kawamata | |
| 2016/0355179 A1* | 12/2016 | Cannella | B60T 7/22 |
| 2017/0253241 A1* | 9/2017 | Filev | G08G 1/09675 |
| 2018/0120854 A1 | 5/2018 | Buburuzan et al. | |
| 2019/0051061 A1* | 2/2019 | Battles | G05D 1/0088 |
| 2019/0375410 A1 | 12/2019 | Zinner et al. | |
| 2020/0062249 A1* | 2/2020 | Light | G08G 1/017 |
| 2020/0160716 A1* | 5/2020 | Mielenz | B60W 30/095 |
| 2020/0341478 A1* | 10/2020 | Fairfield | G08G 1/096833 |
| 2020/0356786 A1* | 11/2020 | Hannah | G08G 1/017 |
| 2021/0394760 A1 | 12/2021 | Mielenz et al. | |

FOREIGN PATENT DOCUMENTS

| | | |
|---|---|---|
| DE | 11 2014 005 245 T5 | 9/2016 |
| DE | 10 2016 203 086 A1 | 8/2017 |
| DE | 10 2016 211 139 A1 | 12/2017 |
| DE | 10 2018 219 911 A1 | 5/2020 |
| DE | 10 2018 222 201 A1 | 6/2020 |
| DE | 10 2019 105 739 A1 | 9/2020 |
| EP | 3 324 385 A1 | 5/2018 |

OTHER PUBLICATIONS

German-language Written Opinion (PCT/ISA/237) issued in PCT Application No. PCT/EP2021/061777 dated Jul. 8, 2021 (six (6) pages).

German-language Office Action issued in German Application No. 10 2020 116 155.7 dated Nov. 26, 2020 (five (5) pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

* cited by examiner

DRIVING ASSISTANCE SYSTEM AND DRIVING ASSISTANCE METHOD FOR THE AUTOMATED DRIVING OF A VEHICLE

BACKGROUND AND SUMMARY

The present disclosure relates to a driving assistance system for the automated driving of a vehicle, to a vehicle having such a driving assistance system, to a driving assistance method for the automated driving of a vehicle, and to a storage medium for executing the method. The present disclosure relates in particular to a safe entry into side roads that can only be driven on by one vehicle due to parked vehicles.

Driving assistance systems for automated driving are steadily becoming more important. Automated driving can be effected with different degrees of automation. Examples of levels of automation are assisted, partially automated, highly automated or fully automated driving. These levels of automation have been defined by the Federal Highway Research Institute (BASt) (see BASt publication "Forschung kompakt", issue November 2012). For example, vehicles with level 4 operate fully autonomously in urban driving.

The driving assistance system for automated driving uses sensors that sense the environment on a visual basis, both in the domain that is visible and the domain that is invisible to humans. The sensors may be, for example, a camera, radar and/or LiDAR. In addition to highly accurate maps, these are the main signal sources for driving assistance systems for automated driving.

In residential areas, residents sometimes park their vehicles in such a manner that sections of the roadway can only be driven on by one vehicle at a time. It is often an objective of the residents to reduce the speed of the passing vehicles and to make it less attractive to drive through the residential area. This can result in an autonomous vehicle having to "snake around" around parked vehicles in a residential area. Moreover, due to the parked vehicles, a deadlock situation can arise when a vehicle turns into a residential area, for example if an oncoming third-party vehicle is driving around a parked vehicle and is in the lane of the autonomous vehicle.

It is an object of the present disclosure to provide a driving assistance system for the automated driving of a vehicle, a vehicle having such a driving assistance system, a driving assistance method for the automated driving of a vehicle, and a storage medium for executing the driving assistance method, that can improve the reliability of a driving assistance system for automated driving.

In particular, it is an object of the present disclosure to resolve, or avoid, deadlock situations when a vehicle turns into a road.

This object is achieved by the provisions of the independent claims. Advantageous designs are specified in the dependent claims.

Specified according to an independent aspect of the present disclosure is a driving assistance system for the automated driving of a vehicle, in particular a motor vehicle. The driving assistance system comprises at least one processor unit, which is configured, when the driving assistance system is performing a maneuver of turning into a road:

to determine, on the basis of ambient data of an environment sensor system of the vehicle, whether another, oncoming road user is blocking a lane of the road that corresponds the vehicle; and, when it is determined that the other road user is blocking the lane of the road that corresponds to the vehicle, to perform a situation assessment in order to determine whether the vehicle should reverse in order to allow the other road user to clear the lane, or whether the other road user should be prompted to clear the lane by reversing.

According to the invention, it is actively decided, on the basis of a situation assessment, whether the primary vehicle should reverse in order to allow the other road user to clear the lane, or whether the other road user should be prompted to clear the lane by reversing. In other words, a decision is made as to who should clear the lane by reversing, based on, for example, whether it is more favorable for the primary vehicle or more favorable for the third-party vehicle to clear the lane. The situation assessment can be used to resolve a deadlock situation that arises, for example, when the third-party vehicle is driving around a parked vehicle and is in the lane of the primary vehicle that is being entered by the primary vehicle after turning.

The vehicle may turn into the road coming from another road. The other road may be, for example, a major road from which the vehicle is turning into a minor road, or side road.

The other road user may be another vehicle, or third-party vehicle, and in particular a moving, or non-parked, vehicle. The third-party vehicle may be blocking the lane of the road that corresponds to the primary vehicle, for example, if the third-party vehicle is driving around a parked vehicle. In other words, the third-party vehicle may be in the lane that the primary vehicle wants to enter, thereby causing the blockage for the primary vehicle.

Depending on obstacles, the lane of the road, corresponding to the vehicle, into which the (primary) vehicle turns may in this case be an appertaining lane (i.e. a lane for the appertaining direction of travel) or an oncoming lane (i.e. a lane for the direction of travel opposite to the appertaining direction of travel). For example, a parked vehicle may occupy the appertaining lane, such that the primary vehicle cannot drive into the appertaining lane, but must first drive onto the oncoming lane in order to drive around the vehicle parked on the appertaining lane. In another example, a parked vehicle may occupy the oncoming lane, such that the primary vehicle can drive into the appertaining lane. In both cases, a deadlock situation can occur if a third-party vehicle, coming from the opposite direction, blocks the lane into which the primary vehicle is turning.

Preferably, the at least one processor unit is configured to determine, after the vehicle has at least partially, and preferably completely, turned, or driven, into the road, whether the other road user is blocking the lane of the road that corresponds to the vehicle. In particular, when the vehicle approaches a side road into which it wishes to turn, detection may first be performed as to whether there is a third-party vehicle currently blocking the entrance in the side road. In this case, the vehicle starts flashing and waits until the third-party vehicle has cleared the entrance before turning into the side road. If, however, no blocking third-party vehicle is detected during the approach to the side road, the vehicle begins to turn in. It may happen at this point that, after the turn has been made, a third-party vehicle is detected in the side road, occupying the lane.

Preferably, the at least one processor unit is configured to perform the situation assessment on the basis of at least one of the following aspects:

a number of other road users blocking the lane of the road that corresponds to the vehicle; and/or a number of obstacles, in particular parked vehicles, on the appertaining lane and/or oncoming lane; and/or a position of the other road user who is blocking the lane of the road that corresponds to the vehicle; and/or a distance that the other road user must travel when reversing in order to clear the lane for the vehicle; and/or a reverse course that the vehicle must travel in order to allow the other road user to clear the lane for the vehicle, for example by moving forward (optionally with an exit from the road e.g. onto a main road); and/or at least one traffic rule, in particular a violation of the at least one traffic rule when the vehicle is reversed in order to allow the other road user to exit the road and thus clear the lane for the vehicle; and/or a cooperative behavior of the other road user, such, for example, as a vehicle dynamic, a number plate (e.g. based on history knowledge), a vehicle type and/or an origin of the vehicle; and/or a traffic volume, in particular a traffic density, on an origin road from which the vehicle turns into the road; and/or a traffic volume, in particular a traffic density, on a pedestrian path and/or cycle path in the vicinity of the vehicle.

Preferably, the at least one processor unit is configured to perform the situation assessment by means of a cost calculation for the vehicle and the other road user.

For example, the at least one processor unit may be configured to calculate first costs for the vehicle and second costs for the other road user (and optionally further road users), wherein the first costs are determined in relation to the reversing of the vehicle in order to allow the other road user to exit the road, and wherein the second costs are determined in relation to a reversing of the other road user to clear the lane for the vehicle.

The costs for all road users for resolving the situation can thus be calculated. In some embodiments, a time loss incurred by the respective road user and/or a risk of accident may be taken into account. Here, it may be assumed that reversing of the primary vehicle into the origin road is associated with a high risk during rush hour, but with a low risk in the late evening hours/at mid-day.

On the basis of the costs, the vehicle may decide whether to reverse voluntarily (e.g. lower or equal costs for this scenario). However, if the vehicle determines that the costs for the other road user are lower, it may actively prompt the other road user to reverse and clear the lane.

For this purpose, the at least one processor unit is preferably configured to determine, based on a comparison of the first costs and the second costs, whether the vehicle should reverse, in order to allow the other road user to exit the road, or the other road user should be prompted to clear the lane by reversing. In particular, the at least one processor unit may determine that the vehicle should reverse if the costs for the vehicle, i.e. the first costs, are less than or equal to the costs for the other road user, i.e. the second costs. Additionally or alternatively, the at least one processor unit may determine that the other road user should be prompted to clear the lane by reversing if the costs for the vehicle, i.e. the first costs, are greater than (or equal to) the costs for the other road user, i.e. the second costs.

Preferably, in order to prompt the other road user to reverse in order to clear the lane, the at least one processor unit is configured to actuate at least one vehicle function in such a manner that the vehicle actively approaches the other road user, and/or visual and/or acoustic information is output to the other road user.

For example, an active approach to the other road user is effected in order to force the other road user to reverse and, optionally, in order to make it clear that it is not possible for the primary vehicle to reverse. If there is no reaction, further signals such as a horn and/or text in the windshield and/or a projection may be used to communicate with the other road user.

In some embodiments, for example if the deadlock situation cannot be resolved by the above measures, the driving assistance system may plan a trajectory for the vehicle to reverse onto the safe sidewalk and allow the other road user to exit the road. This may be effected, for example, by setting the hazard warning lights and may violate traffic rules, but may objectively be the safest way to resolve the deadlock situation by initiative of the automated driving vehicle and avoid the high risk of driving onto the origin road.

Preferably, the at least one processor unit is configured to determine whether at least one traffic rule would be violated in reversing the vehicle in order to allow the other road user to clear the lane for the vehicle; and to communicate with an external unit in order to obtain an authorization for the reversing that violates the at least one traffic rule.

Thus, in some embodiments, the vehicle cannot independently decide whether to violate the traffic rule. The external unit may be associated, for example, with a teleoperator and/or a cooperating police authority. For example, the teleoperator is engaged to take responsibility for the situation and enable the action.

Additionally or alternatively, the cooperating police authority may provide a backend interface. In some embodiments, the maneuver may be reported by the vehicle to the backend prior to initiation, e.g. on a blockchain. The blockchain generates a permission token for the driving maneuver, such that the vehicle can initiate the maneuver. This ensures that observing police officers can verify the maneuver. Moreover, the vehicle cannot arbitrarily decide on the violation of traffic rules, but the police server can flexibly issue permission depending on the location, time and/or type of maneuver.

Preferably, the environment sensor system comprises at least one LiDAR system and/or at least one radar system and/or at least one camera and/or at least one ultrasonic system. The environment sensor system may provide the ambient data (also referred to as "environment data") mapping an area of the environment of the vehicle.

The at least one processor unit is a programmable arithmetic unit, i.e. a machine or an electronic circuit that controls other elements in accordance with transmitted commands and thereby drives an algorithm (process).

According to a further independent aspect of the present disclosure, a vehicle, in particular a motor vehicle, is provided. The vehicle comprises the driving assistance system for automated driving according to embodiments of the present disclosure.

In the context of the document, the term "automated driving" may be understood to mean driving with automated longitudinal or lateral guidance or autonomous driving with automated longitudinal and lateral guidance. Automated driving may be, for example, driving for a longer period of time on the freeway or driving for a limited period of time in the context of parking or maneuvering. The term "automated driving" includes automated driving with any level of automation. Examples of levels of automation are assisted, partially automated, highly automated or fully automated driving. These levels of automation have been defined by the Federal Highway Research Institute (BASt) (see BASt publication "Forschung kompakt", issue November 2012).

In the case of assisted driving, the driver executes the longitudinal or lateral guidance permanently, while the system takes over the respectively other function within certain limits. In the case of partially automated driving (PAD), the system takes over the longitudinal and lateral guidance for a certain period of time and/or in specific situations, and the driver must permanently monitor the system as in assisted driving. In the case of highly automated driving (HAD), the system takes over longitudinal and lateral guidance for a certain period of time without the driver having to permanently monitor the system; however, the driver must be able to take over vehicle guidance within a certain period of time. In the case of fully automated driving (FAD), the system can automatically handle driving in all situations for a specific case of application; a driver is no longer required for this case of application.

The above four levels of automation correspond to SAE levels 1 to 4 of the SAE J3016 standard (SAE—Society of Automotive Engineering). For example, highly automated driving (HAD) level 3 corresponds to the SAE J3016 standard. Furthermore, SAE J3016 provides for SAE level 5 as the highest level of automation, which is not included in the BASt definition. SAE level 5 corresponds to driverless driving, in which the system can automatically handle all situations like a human driver during the entire journey; a driver is generally no longer required.

Preferably, the driving assistance system is configured for automated driving according to SAE level 4 or SAE level 5. In particular, the driving assistance system may be used for an intra-urban area.

The term vehicle includes cars, trucks, buses, motor homes, motorbikes, etc., that are used for transporting persons, goods, etc. In particular, the term includes motor vehicles for passenger transport.

Specified according to a further independent aspect of the present disclosure is a driving assistance method for the automated driving of a vehicle, in particular a motor vehicle. The driving assistance method comprises sensing that a driving assistance system is performing a maneuver of turning into a road; determining, based on ambient data of an environmental sensor system of the vehicle, whether another, oncoming road user is blocking a lane of the road that corresponds to the vehicle; and if it is determined that the other road user is blocking the lane of the road that corresponds to the vehicle, and based on a situation assessment, reversing the vehicle in order to allow the other road user to exit the road, or prompting the other road user to clear the lane by reversing.

The driving assistance method may implement the aspects of the driving assistance system described in this document for automated driving of a vehicle, in particular a motor vehicle.

According to a further, independent aspect of the present disclosure, a software comprising program code for performing the driving assistance method for the automated driving of a vehicle is to be executed when the software runs on one or more software-controlled means.

According to a further, independent aspect of the present disclosure, a software (SW) program is specified. The SW program may be configured to be executed on one or more processors and thereby to perform the driving assistance method for the automated driving a vehicle as described in this document.

According to a further, independent aspect of the present disclosure, a storage medium is specified. The storage medium may comprise an SW program that is configured to be executed on one or more processors and thereby to perform the driving assistance method for the automated driving of a vehicle as described in this document.

BRIEF DESCRIPTION OF THE DRAWINGS

Exemplary embodiments of the disclosure are represented in the figures and described in more detail in the following.

BRIEF DESCRIPTION OF THE DRAWINGS

In the following, unless otherwise noted, the same references are used for the same and similarly acting elements.

DETAILED DESCRIPTION OF THE DRAWINGS

Figure 1:
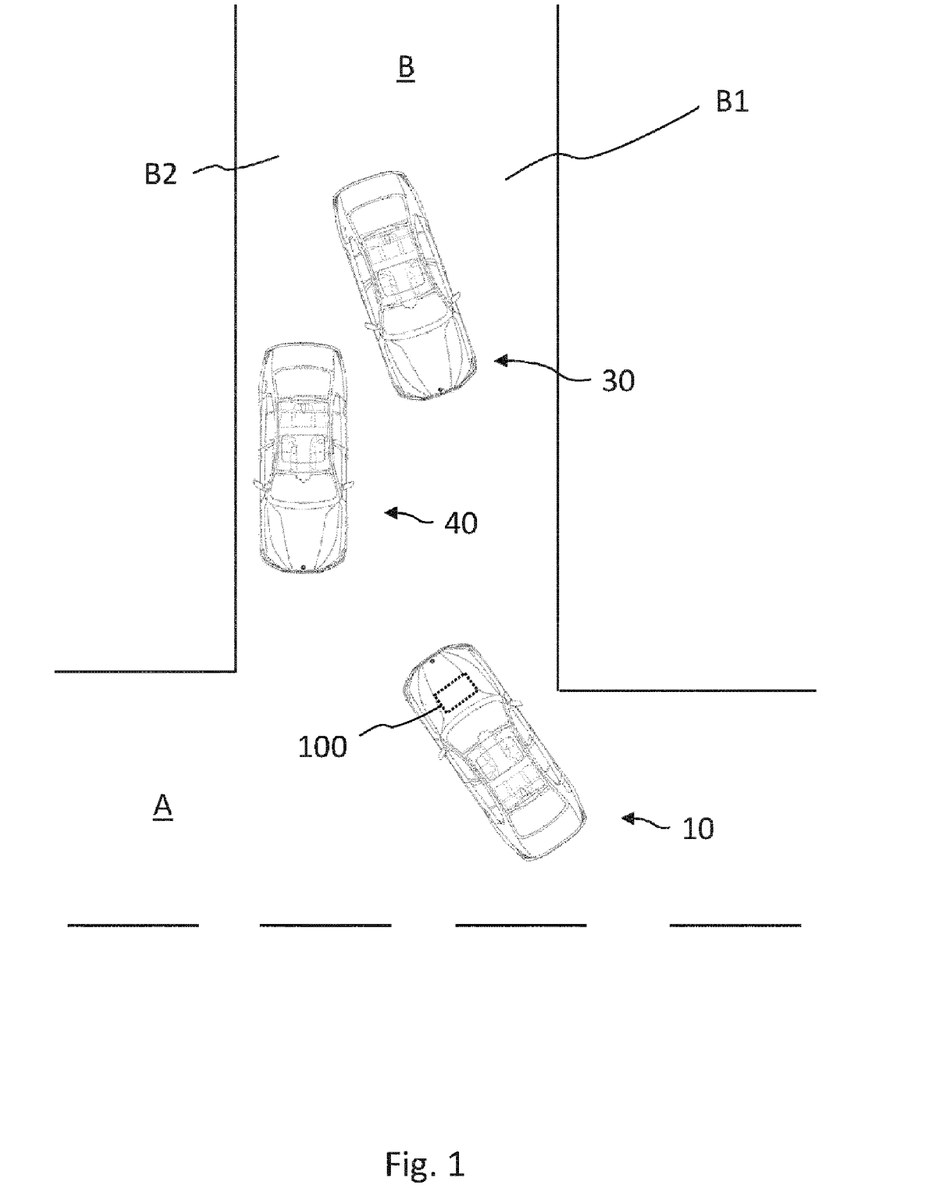
FIG. 1 shows, in schematic form, a deadlock situation when a vehicle enters a side road.
Figure 2:
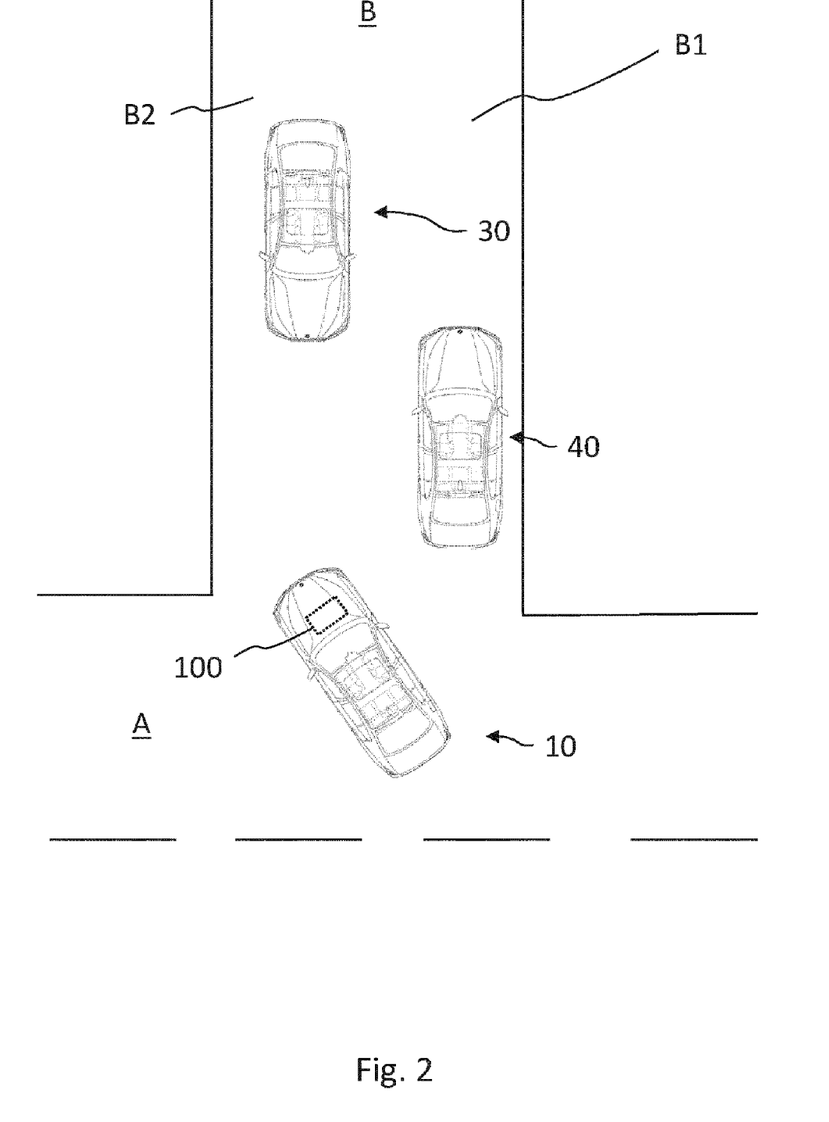
FIG. 2 shows, in schematic form, a further deadlock situation when a vehicle enters a side road.

FIG. 1 shows, in schematic form, a deadlock situation when a vehicle 10 enters a side road. FIG. 2 shows, in schematic form, another deadlock situation when a vehicle 10 enters a side road.

Although, in residential areas, a road should often be completely passable with one lane for each direction of travel, this is often not possible in practice. Here, when a vehicle turns into a residential area, deadlock situations can occur, which must be resolved.

With reference to FIG. 1, the primary vehicle 10 may turn into a second road B, coming from a first road A. The first road A may be, for example, a main road from which the vehicle 10 turns into a minor road, or side road B. The minor road B may have an appertaining lane B1 (i.e. a lane for the appertaining direction of travel), and an oncoming B2 (i.e. a lane for the direction of travel opposite to the appertaining direction of travel).

There may be one or more parked vehicles 40 blocking at least part of the appertaining lane B1 and/or the oncoming lane B2. FIG. 1 shows, as an example, a single parked vehicle 40 in the oncoming lane B2. However, the present disclosure is not limited to this, and there may be a number of vehicles parked in a row in the appertaining lane B1 and/or the oncoming lane B2. For example, there may be a row of parked vehicles on each side, such that a remaining road width is sufficient for passage of only a single vehicle.

Moreover, the present disclosure is not limited to parked vehicles, and other obstacles may be present, blocking at least part of the appertaining lane B1 and/or the oncoming lane B2. The other obstacles may include, for example, a construction site, a container, items on the roadway, etc.

In the example of FIG. 1, another road user coming from the opposite direction, such as, for example, a third-party vehicle 30, drives around the vehicle 40 parked in the oncoming lane B2 and thus blocks the lane (appertaining lane B1 of the primary vehicle 10) into which the primary vehicle 10 is turning.

FIG. 2 shows a further example, in which there is a parked vehicle 40 blocking the appertaining lane B1 of the primary vehicle 10. In this case, the primary vehicle 10 cannot immediately enter the appertaining lane B1, but must first drive into the oncoming lane B2 in order to drive around the parked vehicle 40 in the appertaining lane B1.

The deadlock situation examples represented in FIGS. 1 and 2 may also be further complicated by the fact that the primary vehicle 10 crosses a cycle lane and/or sidewalk (not shown) when turning into the road B.

Deadlock situations of this kind can be resolved with the driving assistance system 100 according to the disclosure. For this purpose, the driving assistance system 100 comprises at least one processor unit, which is configured, when the driving assistance system 100 is performing a maneuver of turning into a road B, to determine, on the basis of environment data of an environment sensor system of the vehicle 10, whether another, oncoming road user 30 is blocking a lane of the road B (B1 in FIG. 1, and B2 in FIG. 2) that corresponds to the vehicle 10, and, when it is determined that the other road user 30 is blocking the lane of the road B that corresponds to the vehicle 10, to perform a situation assessment in order to determine whether the vehicle 10 should reverse in order to allow the other road user 30 to exit the road B in order to clear the blocked lane, or whether the other road user 30 should be prompted to clear the lane by reversing.

In detail, when the vehicle 10 approaches a side road B into which it wishes to turn, detection may first be performed as to whether there is an obstacle such as, for example, another vehicle blocking the entrance. In this case, the vehicle 10 starts flashing and, before turning into the side road B, waits until the blocking vehicle has cleared the side road. If, however, no obstacle is detected during the approach to the side road, the vehicle 10 begins the turn-in maneuver. It may happen at this point that, after the turn has been made, another road user 30 is detected, occupying the lane.

According to the disclosure, the vehicle 10, or the driving assistance system 100, performs a situation assessment and a corresponding driving strategy planning. The situation assessment is effected on the basis of one or more features such as, for example, a number of blocking vehicles on the side road, a position of the blocking vehicles, a reverse course to be travelled by the blocking vehicles until the route is cleared, a classification of the cooperative behavior (e.g. on the basis of vehicle dynamics, number plate (history knowledge), vehicle type, origin of the vehicle, etc.), a traffic density on the main road A, a traffic density of vulnerable road users such as e-scooters, bicars, cyclists etc. on a cycle track, a density of pedestrians on a sidewalk, etc.

The driving strategy planning is effected, for example, by calculating the costs for all road users to resolve the situation. In particular in this case, the time loss of the respective road user as well as the accident risk are taken into account. It is assumed in this case, for example, that reversing into the main road A is associated with a high risk during rush hour, but with a low risk in the late evening hours/at mid-day. On the basis of the costs, vehicle 10 decides whether to reverse voluntarily (e.g. lower or equal cost for this scenario). However, if the vehicle 10 determines that the costs for the conflicting vehicle 30 is lower, it actively prompts the conflicting vehicle 30 to reverse and clear the way.

The prompting may be effected, for example, by actively driving toward the conflicting vehicle 30, in order to force the conflicting vehicle 30 to reverse and make it clear that reversing of the primary vehicle 10 is not possible.

If there is no reaction, in some embodiments further signals such as a horn or text in the windshield or projection may be used to communicate with the other vehicle 30. If this does not resolve the deadlock situation, a trajectory may be planned to reverse onto the safe sidewalk and allow the blocking vehicle 30 to pass. This is effected, for example by use of the hazard lights, and may violate traffic laws, but may objectively be the safest way to resolve the deadlock situation by initiative of the primary vehicle 10 and avoid the high risk of driving onto main road A.

In some embodiments, the primary vehicle 10 cannot independently decide whether to violate the traffic rules. In this case, for example, a teleoperator may be engaged to take responsibility for this situation and enable the action.

Additionally or alternatively, a cooperating police authority may provide a backend interface. Here, the maneuver may be reported on a blockchain before it begins. The blockchain generates a permission token for the driving maneuver, such that the vehicle 10 can initiate the maneuver. This ensures that observing police officers can verify the maneuver. Moreover, the vehicle 10 cannot arbitrarily decide on the violation of the traffic rules, but the police server can issue permission depending, for example, on the location, time and/or type of maneuver.

Figure 3:
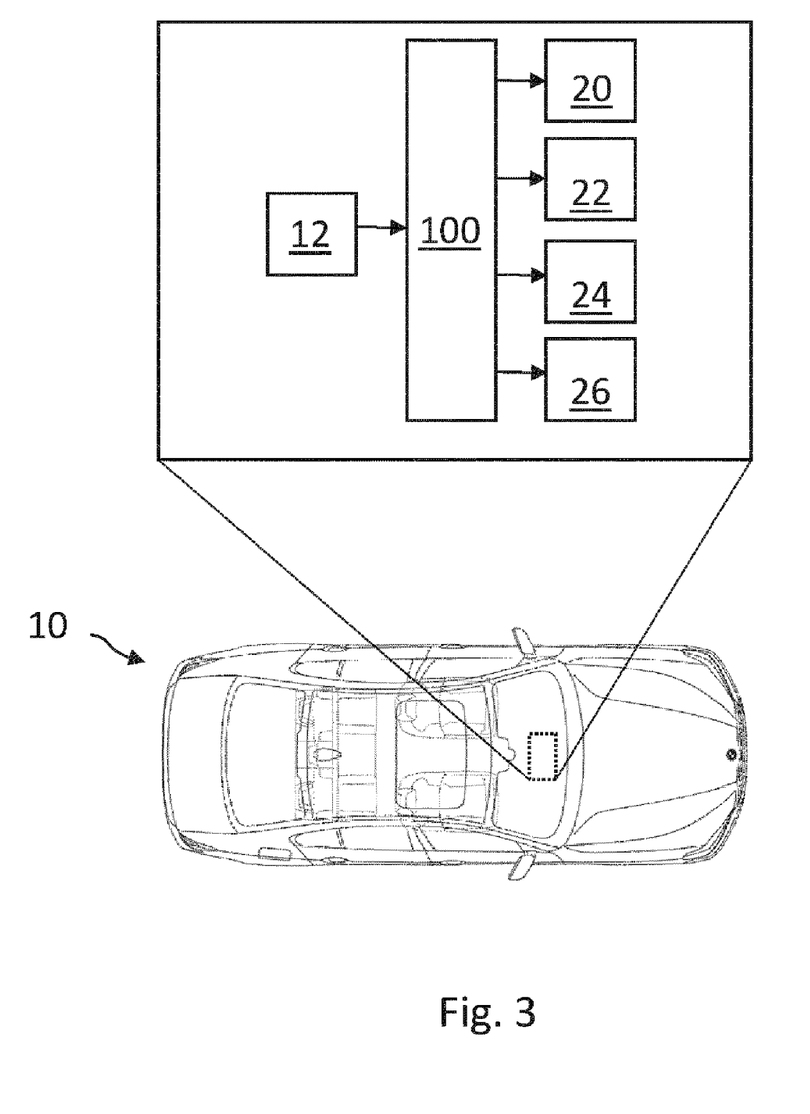
FIG. 3 shows, in schematic form, a vehicle having a driving assistance system for automated driving according to embodiments of the present disclosure.

FIG. 3 shows, in schematic form, a vehicle 10 having a driving assistance system 100 for automated driving according to embodiments of the present disclosure.

In automated driving, the longitudinal and/or lateral guidance of the vehicle 10 is effected automatically. The driving assistance system 100 thus takes over the guidance of the vehicle. For this purpose, the driving assistance system 100 controls the drive 20, the transmission 22, the (for example hydraulic) service brake 24 and the steering 26, via intermediate units, not represented.

For the purpose of planning and performing the automated driving, the driving assistance system 100 receives environment information from an environment sensor system that observes the environment around the vehicle. In particular, the vehicle may comprise at least one environment sensor 12 that is configured to receive environment data indicative of the environment around the vehicle. For example, the at least one environment sensor 12 may comprise one or more ultrasonic systems, one or more LiDAR systems, one or more radar systems, and/or one or more cameras.

In particular, the turning into the road and the reversing of the vehicle may be performed in an automated manner by the driving assistance system 100.

Figure 4:
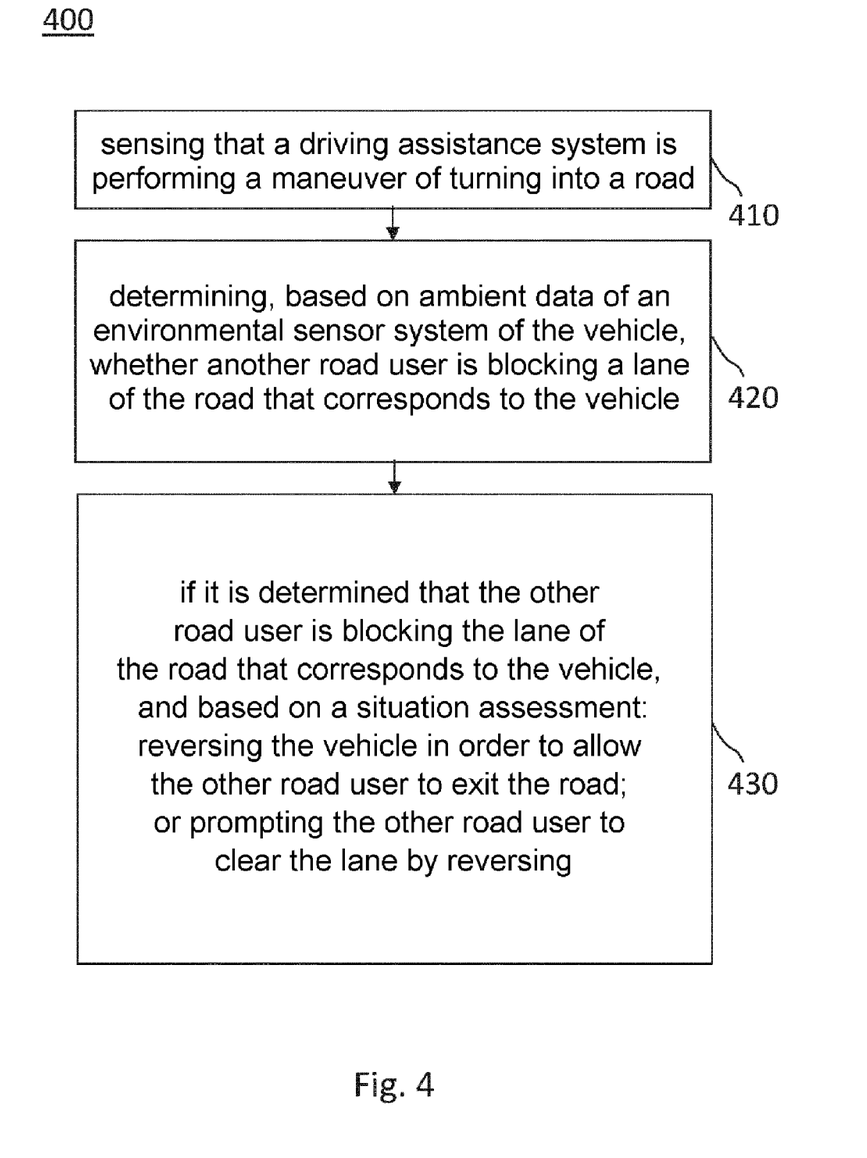
FIG. 4 is a flow diagram of a driving assistance system for the automated driving of a vehicle according to embodiments of the present disclosure.

FIG. 4 is, in schematic form, a flow diagram of a driving assistance method 400 for the automated driving of a vehicle according to embodiments of the present disclosure.

The driving assistance method 400 may be implemented by corresponding software that can be executed by one or more processors (e.g. a CPU).

The driving assistance method 400 comprises, in block 410, sensing that a driving assistance system is performing a maneuver of turning into a road; in block 420, determining, based on environment data of an environmental sensor system of the vehicle, whether another, oncoming road user is blocking a lane of the road that corresponds to the vehicle; and in block 430, when it is determined that the other road user is blocking the lane of the road that corresponds to the vehicle, and based on a situation assessment, reversing the vehicle in order to allow the other road user to exit the road, or prompting the other road user to clear the lane by reversing.

Thus, it is actively decided, on the basis of a situation assessment, whether the primary vehicle should reverse in order to allow the other road user to clear the lane, or whether the other road user should be prompted to clear the lane by reversing. In other words, a decision is made as to who should clear the lane by reversing, based on, for example, whether it is more favorable for the primary vehicle or more favorable for the third-party vehicle to clear the lane. The situation assessment can be used to resolve a deadlock situation that arises, for example, when the third-party vehicle is driving around a parked vehicle and is in the lane of the primary vehicle that is being entered by the primary vehicle after turning.

Although the invention has been further illustrated and explained in detail by preferred exemplary embodiments, the invention is not limited by the disclosed examples, and other variations may be derived from them by a person skilled in the art, without departure from the scope of protection of the invention. It is therefore clear that there is a multiplicity of possible variations. It is also clear that embodiments cited as examples really only represent examples that are not to be understood in any way as limiting, for instance, the scope of protection, the possible applications or the configuration of the invention. Rather, the above description and the description of the figures enable a person skilled in the art to implement the exemplary embodiments in a concrete manner, it being the case that a person skilled in the art, being aware of the disclosed concept of the invention, can make a variety of changes, for example in respect of the function or the arrangement of individual elements mentioned in an exemplary embodiment, without departure from the scope of protection defined by the claims and their legal equivalents, such as, for instance, further explanations in the description.

The invention claimed is:

1. A driving assistance system, comprising:
   at least one processor configured to:
   control a vehicle to turn onto a road via an automated driving function;
   detect, when turning onto the road, that an oncoming road user is blocking a lane of the road so as to create a deadlock situation;
   calculate, in response to the detection, a cost to the vehicle for reversing to allow the oncoming road user to exit the road, and a cost to the oncoming road user to clear the lane by reversing;
   select, based on the calculation, one of the following responsive maneuvers for execution by the driving assistance system: reverse the vehicle to allow the oncoming road user to exit the road, and prompt the oncoming road user to clear the lane by reversing; and
   control the vehicle to execute the selected responsive maneuver via the automated driving function.

2. The driving assistance system of claim 1, wherein the detection is made after the vehicle has at least partially driven onto the road.

3. The driving assistance system of claim 1, wherein the at least one processor is further configured to calculate the respective costs based on at least one of:
   a number of other road users blocking the lane;
   a number of parked vehicles;
   a position of the oncoming road user;
   a distance that the oncoming road user must reverse to clear the lane;
   a reverse course that the vehicle must travel to allow the oncoming road user to exit the road;
   at least one traffic rule;
   an anticipated violation of at least one traffic rule by the vehicle reversing to allow the other road user to exit the road;
   a cooperative behavior of the oncoming road user;
   a traffic volume on an origin road from which the vehicle is turning onto the road; and
   a traffic volume on a pedestrian path and/or cycle path in a vicinity of the vehicle.

4. The driving assistance system of claim 1, the at least one processor is further configured to:
   compare the respective costs and make the selection based on the comparison.

5. The driving assistance system of claim 1, wherein the at least one processor is further configured to:
   prompt the oncoming road user by causing the vehicle to: actively approach the oncoming road user and/or output visual and/or acoustic information to the other road user.

6. The driving assistance system of claim 1, wherein the at least one processor is further configured to:
   determine that a traffic rule would be violated by reversing the vehicle to allow the oncoming road user to exit the road; and
   obtain, from an external unit, authorization to reverse the vehicle in violation of the traffic rule.

7. A vehicle comprising the driving assistance system of claim 1.

8. A driving assistance method, comprising:
   controlling a vehicle to turn on a road via an automated driving function of a driving assistance system;
   detecting, when turning onto the road, that an oncoming road user is blocking a lane of the road so as to create a deadlock situation;
   calculating, in response to the detection, a cost to the vehicle for reversing to allow the oncoming road user to exit the road, and a cost to the oncoming road user to clear the lane by reversing;
   selecting, based on the calculation, one of the following responsive maneuvers for execution by the driving assistance system: reverse the vehicle to allow the oncoming road user to exit the road, prompt the oncoming road user to clear the lane by reversing; and
   controlling the vehicle to execute the selected responsive maneuver via the automated driving function.

9. A computer product comprising a non-transitory computer readable medium having stored thereon program code that, when executed by at least one processing unit, carries out the driving assistance method of claim 8.

* * * * *